United States Patent
Rajashekara et al.

(10) Patent No.: US 7,084,525 B2
(45) Date of Patent: Aug. 1, 2006

(54) POWER SYSTEM TO TRANSFER POWER BETWEEN A PLURALITY OF POWER SOURCES

(75) Inventors: Kaushik Rajashekara, Carmel, IN (US); John G. Noetzel, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 445 days.

(21) Appl. No.: 10/650,653

(22) Filed: Aug. 28, 2003

(65) Prior Publication Data

US 2005/0047039 A1 Mar. 3, 2005

(51) Int. Cl.
*H02J 1/00* (2006.01)
(52) U.S. Cl. .............................. 307/82; 363/59; 363/60
(58) Field of Classification Search ................. 307/82; 363/59, 60, 62
See application file for complete search history.

(56) References Cited

U.S. PATENT DOCUMENTS

| | | | |
|---|---|---|---|
| 5,578,911 A | 11/1996 | Carter et al. ................ 318/376 | |
| 6,139,351 A | 10/2000 | Schaefer et al. | |
| 6,160,722 A * | 12/2000 | Thommes et al. ............ 363/37 | |
| 6,230,494 B1 | 5/2001 | Botti et al. | |
| 6,276,960 B1 | 8/2001 | Schaefer et al. | |
| 6,365,297 B1 | 4/2002 | Wolczak et al. | |
| 6,411,534 B1 | 6/2002 | Kurnia et al. ................ 363/98 | |
| 6,577,098 B1 | 6/2003 | Griffey et al. | |
| 6,577,099 B1 | 6/2003 | Kruger et al. | |
| 6,609,582 B1 | 8/2003 | Botti et al. | |
| 2005/0218876 A1* | 10/2005 | Nino ........................ 323/282 | |

* cited by examiner

*Primary Examiner*—Lynn Feild
*Assistant Examiner*—Michael Rutland-Wallis
(74) *Attorney, Agent, or Firm*—Jimmy L. Funke (57) ABSTRACT

A power system used for transferring power between a plurality of power sources is provided. A power system according to the present invention is comprised of a plurality of power sources, wherein each source includes a pair of terminals. The power system is further comprised of a power converter, including a pair of switches for each one of the plurality of power sources. Each of these switches are connected to the respective pairs of terminals for each source. Each switch further includes an associated diode, and each switch pair includes a common node. The power converter further includes a plurality of inductors numbering one less than the number of power sources, wherein each inductor is connected across two of the common nodes. The power converter further includes a control unit configured to actuate the switches in accordance with, and to carry out, one of a plurality of modes of operation.

21 Claims, 2 Drawing Sheets

POWER SYSTEM TO TRANSFER POWER BETWEEN A PLURALITY OF POWER SOURCES

TECHNICAL FIELD

The present invention relates to a power system used to transfer power between a plurality of power sources.

BACKGROUND OF THE INVENTION

In addition to having a fuel cell, conventional fuel cell systems have one or more power sources such as a battery pack, an ultracapacitor, etc. Each one of these power sources can be used to carry out a number of operations within the fuel cell system.

Generally, the battery pack is connected to the system at the output of the fuel cell stack. It is used to both start the operation of the fuel system, as well as to share the load of the associated application (e.g., vehicle electrical system). The ultracapacitor is typically connected across the battery pack to provide peak power in the form of burst power pulses to the application powered by the fuel cell system.

In addition to powering the application to which it is connected, the fuel cell stack is also utilized to charge the battery pack and/or the ultracapacitor, when their respective states of charge drop below a predetermined level.

Generally, these power sources have differing rated voltage outputs. The voltage outputs of the battery pack and ultracapacitor are typically below the system voltage. Accordingly, for the battery pack and ultracapacitor to provide power to the auxiliary systems of the fuel cell system, and to provide the necessary burst power pulses to the load of the system, the voltage of these power sources needs to be stepped up, or boosted. Alternatively, when the voltage level of the battery pack and/or ultracapacitor are low, therefore necessitating a "re-charge" by the fuel cell stack, the voltage level of the fuel cell must be stepped down, or "bucked."

To carry out these boost and buck functions, it is known to provide separate bi-directional converters to connect the battery pack and ultracapacitor, respectively, to the system bus. The use of separate converters for each power source results in added components and hardware to a system, thereby increasing size. This is a problem for applications that are constrained in size. Under this conventional approach, each time an additional power source is added to the system, at least one additional converter is required, thereby further adding additional components and circuitry to the system, increasing size as well as cost.

It is the objective of the present invention to provide a device that minimizes or eliminates one or more of the foregoing problems.

SUMMARY OF THE INVENTION

The power system of the present invention includes a first power source which has a first pair of terminals associated therewith. It further includes a second and third power source, each having a respective pair of terminals designated as a second pair of terminals and a third pair of terminals.

The power system also includes a first pair of switches electrically connected to the first pair of terminals. In one embodiment, the switches are of the type that includes an associated diode. The first switch pair also has a first common node. The power system further includes a second and a third pair of switches, which are electrically connected to the second and third pairs of terminals, respectively; in one embodiment, each switch of the second and third pairs is of the type also having an associated anti-parallel diode. Both the second and third switch pairs also have a respective common node associated therewith, designated as a second common node and a third common node.

The power system further includes a first inductor and a second inductor. The first inductor is electrically connected between the first common node of the first pair of switches, and the third common node associated with the third pair of switches. The second inductor is electrically connected between the first common node associated with the first pair of switches, and the second common of the second pair of switches.

The power system also includes a control unit, which is configured to actuate the first, second, and third pair of switches in accordance with one of a plurality of modes of operation for transferring power between at least a pair of the first, second, and third power sources.

The invention provides numerous advantages. For example, the present invention allows for the interconnection of two or more power sources independent of their voltage levels. Additionally, whereas conventional fuel cell systems require separate converters for each power source, as described in the Background, the present invention carries out the same functionality using a single topology. Thus fewer components are required, and the overall size and cost of the system is reduced.

The foregoing summary has been set forth for an arrangement involving three power sources. It should be understood that the invention is not so limited, and may be applied to n power sources, where n is an integer equal to or greater than two.

BRIEF DESCRIPTION OF THE DRAWINGS

The present invention will now be described by way of example, with reference to the accompanying drawings.

DESCRIPTION OF PREFERRED EMBODIMENT

Figure 1:
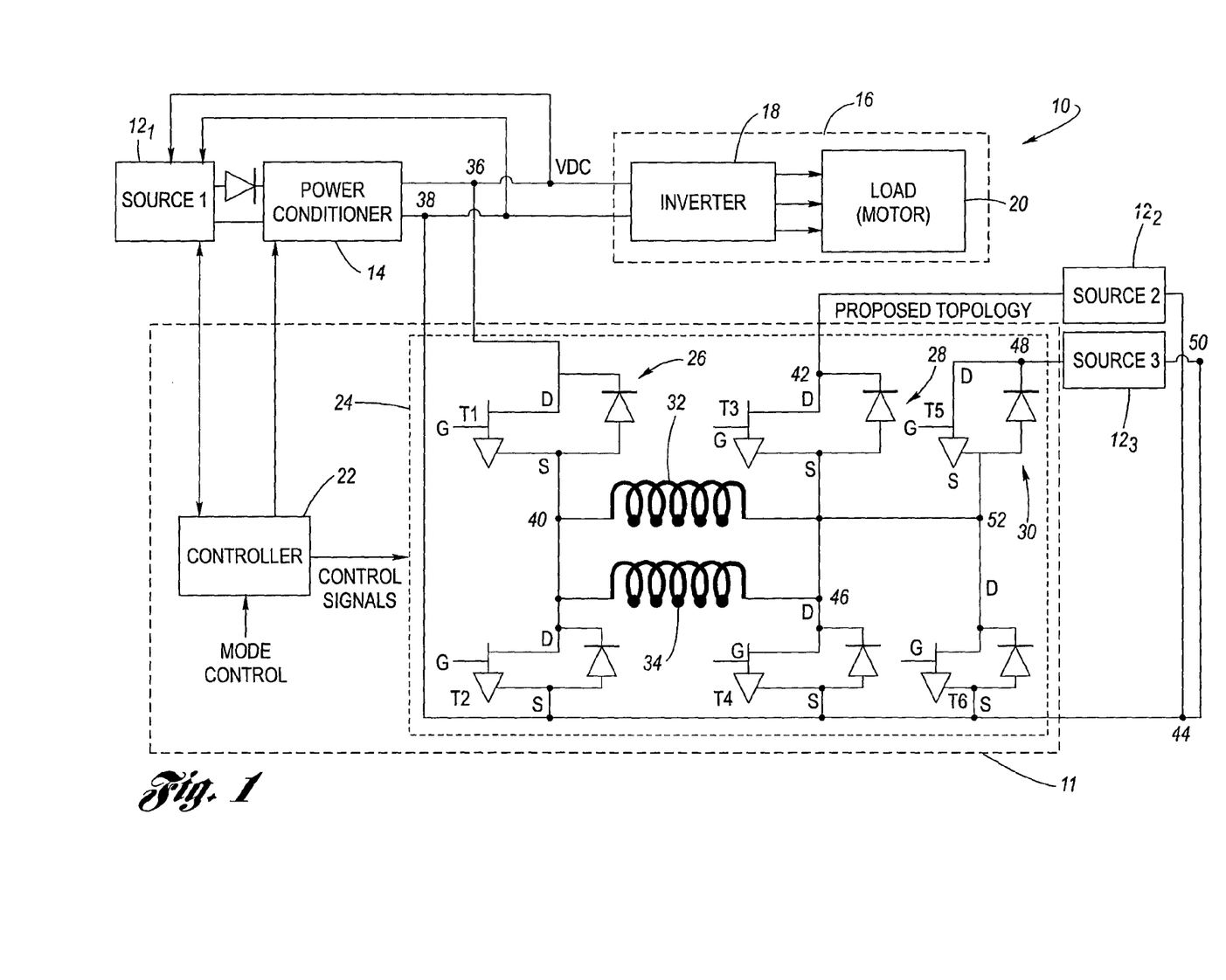
FIG. 1 is a simplified schematic and block diagram view of a power sysem in accordance with the present invention.

Referring now to the drawings wherein like reference numerals are used to identify identical components in the various views, FIG. 1 is a simplified schematic and block diagram of an inventive power system 10. Power system 10 includes a power converter 11 that can be used to transfer power between a plurality of power sources $12_1$, $12_2$, $12_3$, ..., $12_n$ ($12_n$ not being shown) in a given power system.

Power converter 11 can be utilized in a number of systems in which power has to be transferred from one power source to another, independent of the voltage levels of the power sources. Power converter 11 can be used to increase (boost) or reduce (buck) the voltage level of one source in order to provide power to an application, or to provide the necessary voltage level required to charge one of the other power sources in the system. Examples of suitable applications include but are not limited to electric motor applications such as hybrid vehicles; peak shaving applications; or systems powered by a fuel cell and battery, or an ultracapacitor and a battery, or between two or more battery packs connected to the same system. It should be noted, however, that these applications are exemplary only, and not meant to be limiting in nature.

First power source $12_1$ is a first power source, such as a fuel cell, that is used to provide power to an application, as well as to charge other power sources in the system. The output of power source $12_1$ may be electrically connected to a power conditioner 14, whose output is designated as the "DC Link," and is electrically connected to an application 16. The DC Link, as its name suggests, provides a bus to which the various power sources connect through converter 11. First power source $12_1$ provides power to application 16, which may include the accessories of a vehicle, such as, for example, the air conditioning system; or may include an inverter 18, as known in the art, and a load 20, such as an AC motor used to drive devices such as, for example, conventional microwave ovens or refrigerators, or to provide propulsion torque to a vehicle. If, on the other hand, first power source $12_1$ is being used to charge another one or more of the power sources in the system, its voltage level may need to be boosted or bucked by power converter 11 in order to carry out this operation. It should be noted that other types of power sources in addition to fuel cells are also within the spirit and scope of the invention, as are other types of application configurations, and thus, the above is provided for illustrative purposes only, and not meant to be limiting in nature.

Power source $12_2$ is a second power source, such as a 28-volt or a 42-volt battery, which may be used for a number of purposes. For instance, power source $12_2$ can be used to provide power to application 16, share the load presented to power source $12_1$, as well as to charge other power sources in the system. The voltage level of power source $12_2$ can either be boosted or bucked by power converter 11 to carry out this functionality. It should be noted that power source $12_2$ is not limited to taking the form of a battery. Rather, the battery is used for illustrative purposes only, and is not meant to be limiting in nature.

Power source $12_3$ is a third power source, such as an ultracapacitor. Power source $12_3$ can be used to provide peak power to application 16 in the form of burst (i.e., relatively short time duration) power pulses. As with power sources $12_1$, $12_2$, the voltage level of power source $12_3$ may need to be adjusted by way of a boost or buck operation performed by power converter 11 in order to provide the voltage level required to carry out a given operation. As with power sources $12_1$ and $12_2$, $12_3$ is not limited to taking the form of an ultracapacitor. Rather, an ultracapacitor is used for illustrative purposes, and is not meant to be limiting in nature.

In conventional arrangements, a separate power converter is required for each distinct power source to carry out the functionality described above. Conversely, the present invention provides a single power converter 11 that can be configured with a plurality of power sources, such as those described above, to eliminate the need for separate power converters for each power source. Accordingly, less components are required, thereby reducing the cost and bulk (i.e., size) of the system.

Power converter 11 comprises a control unit 22 and a switch network 24. Control unit 22 is configured to actuate the switches in switch network 24 in accordance with one of a plurality of modes of operations carried out by power converter 11 in transferring power between at least a pair of power sources. Control unit 22 sends control signals to the switches in switch network 24 to control the conduction states of the switches. This control is carried out using programmed control strategies that are known in the art.

Switch network 24 carries out the functionality of the modes of operation of power system 10. In particular, the components are utilized to perform boost or buck operations, depending on the mode of operation delivered by control unit 22. Switch network 24 includes a pair of switches for each power source in the system. In the illustrated embodiment, switch network 24 includes a first pair of switches 26 (designated T1, T2); a second pair of switches 28 (designated T3, T4); and a third pair of switches 30 (designated T5, T6). Switch network 24 further includes a plurality of inductors. Generally, switch network 24 includes n−1 inductors wherein n represents the number of auxiliary power sources in the system. In the illustrated embodiment, there are three power sources, thus switch network 24 includes two inductors, a first inductor 32 and a second inductor 34. It should be noted that the illustrated embodiments set forth above are exemplary only, and not meant to be limiting in nature.

First power source $12_1$ includes a first pair of terminals 36, 38, and first switch pair 26 includes a first common node 40. Terminal 36 represents the positive terminal of power source $12_1$, and terminal 38 represents the negative terminal of power source $12_1$. In the illustrated embodiment, switch pair 26 includes an upper switch T1 and a lower switch T2, wherein each switch has a drain, a gate, and a source terminal. In the illustrated embodiment, the source terminal of switch T1 is connected to the drain terminal of switch T2. The switches in switch pair 26 can be devices such as MOSFET or IGBTs devices, both of which are known in the art. Each device has an associated anti-parellel diode (unlabelled). In a preferred embodiment, and for illustration purposes, MOSFET switches are shown in FIG. 1 for all three switch pairs. Use of MOSFET devices will enable synchronous rectifier operation, as will be described below. It should be noted, however, that this MOSFET configuration is exemplary only, and not meant to be limiting in nature.

Second power source $12_2$ includes a second pair of terminals 42, 44, and second switch pair 28 includes a second common node 46. Terminal 42 represents the positive terminal of power source $12_2$, and terminal 44 represents the negative terminal of power source $12_2$. In the illustrated embodiment, switch pair 28 includes an upper switch T3 and a lower switch T4, wherein each switch has a drain, a gate, and a source terminal. In the illustrated embodiment, the source terminal of switch T3 is connected to the drain terminal of switch T4. The switches in switch pair 28 can be devices such as MOSFET or IGBT devices, both of which are known in the art. Each device also has an associated anti-parallel diode (unlabelled).

Third power source $12_3$ includes a third pair of terminals 48, 50, and third switch pair 30 includes a third common node 52. Terminal 48 represents the positive terminal of power source $12_3$, and terminal 50 represents the negative terminal of power source $12_3$. In the illustrated embodiment, switch pair 30 includes an upper switch T5 and a lower switch T6, wherein each switch has a drain, a gate, and a source terminal. In the illustrated embodiment, the source terminal of switch T5 is connected to the drain terminal of switch T6. The switches in switch pair 30 can be devices such as MOSFET or IGBT devices, both of which are known in the art. Each device also has an associated anti-parallel diode (unlabelled).

In switch network 24, first inductor 32 is connected across first common node 40 and third common node 52, and second inductor 34 is connected across first common node 40 and second common node 46.

Before discussing the operation of power system 10, a preliminary discussion of terms and their associated definitions will prove helpful. Power system 10 can operate in any one of a plurality of modes of operation, wherein each mode includes either a boost or buck operation. A boost operation is one in which the voltage level of a power source is increased or stepped up to a required level for a given operation. A buck operation is one in which the voltage level of a power source is reduced or stepped down to a level required for a given operation.

Figure 2:
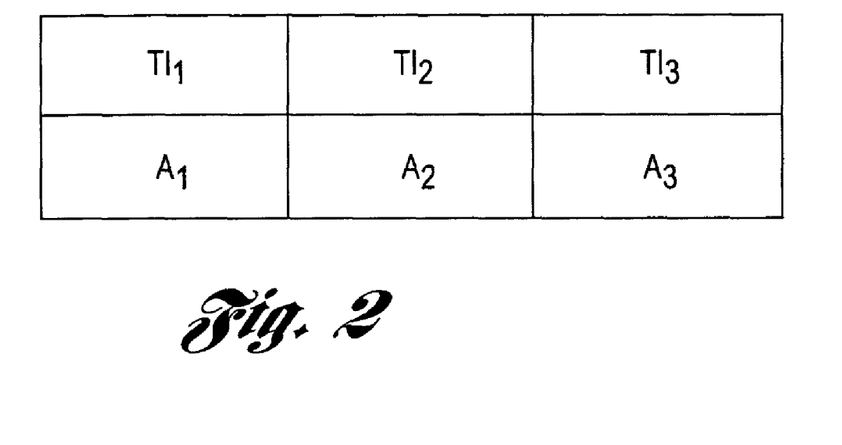
FIG. 2 is a table representing the stages of a mode of operation of the present invention.

FIG. 2 shows the correspondence between the time intervals and the switch arrangements for switch network 24. With reference to FIG. 2, each mode of operation includes three separate and distinct time intervals. During each time interval (represented as $TI_1$, $TI_2$, $TI_3$ in FIG. 2), the switches of switch network 24 are configured in a given arrangement that differs from the arrangements of the other two time intervals. Thus, because there are three time intervals, there are three separate and distinct arrangements, A1, A2, A3, for each mode of operation. It should be noted that the three time interval operation applies when switch network 24 is comprised of MOSFET devices. If, for example, IGBT devices are used in place of the MOSFET devices, then there would only be two time intervals as opposed to three. However, for illustrative purposes only, the MOSFET configuration is discussed hereinafter.

In the illustrated embodiment, wherein the system includes three power sources, six modes of operation are possible. A discussion of each mode of operation follows.

Battery-to-DC Link Boost Mode

In this mode of operation, the voltage level of the power source $12_2$, a battery in the illustrated embodiment, is boosted to the nominal level of the DC Link, which will allow power source $12_2$ to power application 16 associated with the system. This mode could be used when the voltage of the power source $12_1$ is zero, thus requiring the use of another power source to power application 16, or to provide power to application 16 in addition to the power from power source $12_1$.

In this mode, control unit 22 is configured to control the conduction states of the switches in switch network 24 in three distinct time intervals, as shown in Table 1 below, resulting in three separate switch arrangements, one for each time interval.

TABLE 1

Battery-to-DC Link Boost Mode

| TIME INTERVAL 1 | | TIME INTERVAL 2 | | TIME INTERVAL 3 | |
|---|---|---|---|---|---|
| $T_1$ | Off | $T_1$ | Off Diode On | $T_1$ | On Diode Off |
| $T_2$ | On | $T_2$ | Off | $T_2$ | Off |
| $T_3$ | On | $T_3$ | On | $T_3$ | On |
| $T_4$ | Off | $T_4$ | Off | $T_4$ | Off |
| $T_5$ | Off | $T_5$ | Off | $T_5$ | Off |
| $T_6$ | Off | $T_6$ | Off | $T_6$ | Off |

Figure 3:
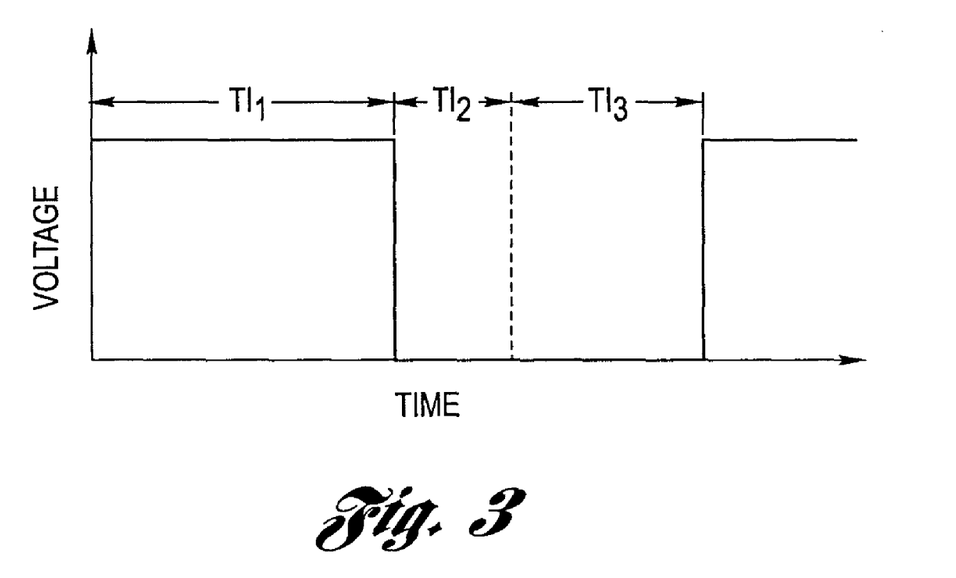
FIG. 3 is a chart representative of the time intervals within which the present invention operates.

With combined reference to Table 1 and FIGS. 2–3, during the first time interval of this mode, control unit 22 controls the switches in switch network 24 for conduction/blocking in accordance with arrangement A1. In arrangement A1, switch T2 of switch pair 26, and switch T3 of switch pair 28, are turned ON (for conduction), while the remainder of the switches are turned OFF (no conduction). Accordingly, this results in current flowing from the positive terminal of power source $12_2$, through switch T3, through inductor 34, through switch T2, to ground. During this time interval, the switch arrangement allows for the charging of inductor 34 by the electrical current passing therethrough, as known in the art.

Once inductor 34 is charged for a predetermined time, and during the second time interval, control unit 22 controls the switches in switch network 24 in accordance with arrangement A2. In arrangement A2, switch T2 of switch pair 26 is turned OFF, switch T3 of switch pair 28 remains ON, and the remainder of the switches are kept OFF. This results in current flowing out of the positive terminal of power source $12_2$, through switch T3, sourced from inductor 34, through the diode of switch T1 of switch pair 26, to the DC Link, and then back to ground. The flow of the current through the diode results in a voltage drop within or near the range of 1.0V–1.2V.

In the third time interval, control unit 22 controls the switches of switch network 24 in accordance with arrangement A3. In arrangement A3, switch T1 of switch pair 26 is turned ON, switch T3 of switch pair 28 remains ON, and the remaining switches are kept OFF. The current continues to flow from the positive terminal of power source $12_2$, through switch T3, sourced from inductor 34, through switch T1 (as opposed to through its associated diode), to the DC Link, and then back to ground. The flow of the current through switch T1, as opposed to the diode, effectively makes switch T1 a synchronous rectifier (when the switch is a MOSFET device) which results in a reduced voltage drop to a level of around 0.2V, thereby making the system more efficient (i.e., less of a forward voltage drop).

With continued reference to FIGS. 2–3, in order to calculate the level of the boosted voltage, the duty cycle must first be determined. In this mode of operation, the duty cycle of switch T2 of switch pair 26 is determined using the following equation designated as equation (1):

$$D = \frac{TI_1}{T}; \quad (1)$$

wherein D is the duty cycle, $TI_1$ is the amount of time switch T2 is in the ON conductive state, and T is the total time of the period.

With the duty cycle calculated using equation (1), the boosted voltage level can then be calculated using equation (2) set forth below:

$$V_{DC} = \frac{V_{Battery}}{1-D}; \quad (2)$$

wherein $V_{DC}$ is the boosted voltage level, $V_{Battery}$ is the original voltage of the battery, and D is the duty cycle.

Control unit 22 is configured and programmed to achieve these levels by adjusting the duty cycles of the switches based on inputs (not shown) relating to the associated application 16, and more particularly, load 20. These inputs may include the required voltage level for load 20, the output voltage on the DC Link, and the voltage level of the battery (i.e., the level of second power source $12_2$). Strategies are known to accomplish the foregoing, and following a first cycle through the mode of operation, the cycle may be repeated.

Battery-to-Ultracapacitor Boost Mode

In this mode of operation, power source $12_2$, a battery in the illustrated embodiment, is used to charge power source $12_3$, an ultracapacitor in the illustrated embodiment. If the voltage level of power source $12_2$ is less than that of power source $12_3$, then the voltage level of power source $12_2$ is boosted to a level that will allow the charging of power source $12_3$.

In this mode, control unit 22 is configured to control the conduction states of the switches in switch network 24 in three distinct time intervals, as shown in Table 2 below, resulting in three separate switch arrangements, one for each time interval.

TABLE 2

Battery-to-Ultracapacitor Boost Mode

| TIME INTERVAL 1 | | TIME INTERVAL 2 | | TIME INTERVAL 3 | |
|---|---|---|---|---|---|
| $T_1$ | Off | $T_1$ | Off | $T_1$ | Off |
| $T_2$ | Off | $T_2$ | Off | $T_2$ | Off |
| $T_3$ | On  | $T_3$ | On  | $T_3$ | On  |
| $T_4$ | Off | $T_4$ | Off | $T_4$ | Off |
| $T_5$ | Off | $T_5$ | Off | $T_5$ | On  |
|       |     | Diode | On  | Diode | Off |
| $T_6$ | On  | $T_6$ | Off | $T_6$ | Off |

With combined reference to Table 2 and FIGS. 2 and 3, during the first time interval of this mode, control unit 22 controls the switches in switch network 24 for conduction/blocking in accordance with arrangement A1. In arrangement A1, switch T3 of switch pair 28, and switch T6 of switch pair 30, are turned ON (for conduction), while the remainder of the switches are turned OFF (no conduction). Accordingly, this results in current flowing from the positive terminal of power source $12_2$, through switch T3, through inductor 34, through inductor 32, through switch T6, to ground. During this time interval, the switch arrangement allows for the charging of inductors 32, 34 by the electrical current passing therethrough, as known in the art.

Once inductors 32, 34 are charged for a predetermined time, and during the second time interval, control unit 22 controls the switches in switch network 24 in accordance with arrangement A2. In arrangement A2, switch T6 of switch pair 30 is turned OFF, switch T3 of switch pair 28 remains ON, and the remainder of the switches are kept OFF. This results in current flowing out of the positive terminal of power source $12_2$, through switch T3, sourced from inductor 34, through inductor 32, through the diode of switch T5 of switch pair 30, to the positive terminal of power source $12_3$, and then back to ground. The flow of the current through the diode results in a voltage drop within or near the range of 1.0V–1.2V.

In the third time interval, control unit 22 controls the switches of switch network 24 in accordance with arrangement A3. In this arrangement, switch T5 of switch pair 30 is turned ON, switch T3 of switch pair 28 remains ON, and the remaining switches are kept OFF. The current continues to flow from the positive terminal of power source $12_2$, through switch T3, sourced from inductor 34, through inductor 32, through switch T5 (as opposed to through its associated diode), to the positive terminal of power source $12_3$, then to ground. The flow of the current through switch T5, as opposed to the diode, effectively makes switch T5 a synchronous rectifier (when the switch is a MOSFET device) which results in a reduced voltage drop to a level of around 0.2V, thereby making the system more efficient (i.e., less of a forward voltage drop).

With continued reference to FIGS. 2 and 3, in order to calculate the level of the boosted voltage, the duty cycle must first be determined. In this mode of operation, the duty cycle of switch T6 of switch pair 30 is determined using the following equation designated as equation (3):

$$D = \frac{TI_1}{T}; \qquad (3)$$

wherein D is the duty cycle, $TI_1$ is the amount of time switch T6 is in the ON conductive state, and T is the total time of the period.

With the duty cycle calculated using equation (3), the boosted voltage level can then be calculated using equation (4) set forth below:

$$V_{DC} = \frac{V_{Battery}}{1-D}; \qquad (4)$$

wherein $V_{DC}$ is the boosted voltage level, $V_{Battery}$ is the original voltage of the battery, and D is the duty cycle.

Control unit 22 is configured and programmed to achieve these levels by adjusting the duty cycles of the switches based on inputs relating to application 16, the voltage level of the battery (i.e., the level of second power source $12_2$), and the voltage level of the ultracapacitor (i.e., the level of third power source $12_3$), for example. Strategies are known to accomplish the foregoing, and following a first cycle through the mode of operation, the cycle may be repeated.

Ultracapacitor-to-DC Link Boost Mode

In this mode of operation, power source $12_3$, an ultracapacitor in the illustrated embodiment, is used provide peak power in the form of burst power pulses to application 16 through the DC Link. In order to carry out this mode of operation, the voltage level of the ultracapacitor has to be boosted to the necessary levels.

In this mode, as with the two previously discussed modes, control unit 22 is configured to control the conduction states of the switches in switch network 24 in three distinct time intervals, as shown in Table 3 below, resulting in three separate switch arrangements, one for each time interval.

TABLE 3

Ultracapacitor-to-DC Link Boost Mode

| TIME INTERVAL 1 | | TIME INTERVAL 2 | | TIME INTERVAL 3 | |
|---|---|---|---|---|---|
| $T_1$ | Off | $T_1$ | Off | $T_1$ | On  |
|       |     | Diode | On  | Diode | Off |
| $T_2$ | On  | $T_2$ | Off | $T_2$ | Off |
| $T_3$ | Off | $T_3$ | Off | $T_3$ | Off |
| $T_4$ | Off | $T_4$ | Off | $T_4$ | Off |

TABLE 3-continued

Ultracapacitor-to-DC Link Boost Mode

| TIME INTERVAL 1 | | TIME INTERVAL 2 | | TIME INTERVAL 3 | |
|---|---|---|---|---|---|
| $T_5$ | On | $T_5$ | On | $T_5$ | On |
| $T_6$ | Off | $T_6$ | Off | $T_6$ | Off |

With combined reference to Table 3 and FIGS. 2 and 3, during the first time interval of this mode, control unit 22 controls the the switches in switch network 24 for conduction/blocking in accordance with arrangement A1. In arrangement A1, switch T2 of switch pair 26, and switch T5 of switch pair 30, are turned ON (for conduction), while the remainder of the switches are turned OFF (no conduction). Accordingly, this results in current flowing from the positive terminal of power source $12_3$, through switch T5, through inductor 32, through switch T2, to ground. During this time interval, the switch arrangement allows for the charging of inductor 32 by the electrical current passing therethrough, as known in the art.

Once inductor 32 is charged for a predetermined time, and during the second time interval, control unit 22 controls the switches in switch network 24 in accordance with arrangement A2. In arrangement A2, switch T2 of switch pair 26 is turned OFF, switch T5 of switch pair 30 remains ON, and the remaining switches are kept OFF. This results in current flowing out of the positive terminal of power source $12_3$, through switch T5, sourced from inductor 32, through the diode of switch T1 of switch pair 26, to the DC Link, and then to ground. The flow of the current through the diode results in a voltage drop within or near the range of 1.0V–1.2V.

In the third time interval, control unit 22 controls the switches of switch network 24 in accordance with arrangement A3. In arrangement A3, switch T5 of switch pair 30 remains ON, switch T1 of switch pair 26 is turned ON, and the remaining switches are kept OFF. The current continues to flow from the positive terminal of power source $12_3$, through switch T5, sourced from inductor 32, through switch T1 (as opposed to through its associated diode), to the DC Link, then to ground. The flow of the current through switch T1, as opposed to the diode, effectively makes switch T1 a synchronous rectifier (when the switch is a MOSFET device) which results in a reduced voltage drop to a level of around 0.2V, thereby making the system more efficient (i.e., less of a forward voltage drop).

With continued reference to FIGS. 2 and 3, in order to calculate the level of the boosted voltage, the duty cycle must first be determined. In this mode of operation, the duty cycle of switch T2 of switch pair 26 is determined using the following equation designated as equation (5):

$$D = \frac{TI_1}{T}; \quad (5)$$

wherein D is the duty cycle, $TI_1$ is the amount of time switch T2 is in the ON conductive state, and T is the total time of the period.

With the duty cycle calculated using equation (5), the boosted voltage level can then be calculated using equation (6) set forth below:

$$V_{DC} = \frac{V_{Ultra}}{1-D}; \quad (6)$$

wherein $V_{DC}$ is the boosted voltage level, $V_{Ultra}$ is the original voltage of the ultracapacitor, and D is the duty cycle.

Control unit 22 is configured and programmed to achieve these levels by adjusting the duty cycles of the switches based on inputs relating to the associated application 16, and particularly, load 20. These inputs may include the required voltage level of the load, the output voltage on the DC Link, and the voltage level of the ultracapacitor (i.e., the level of second power source $12_3$). Strategies are known to accomplish the foregoing, and following a first cycle through the mode of operation, the cycle may be repeated.

DC Link-to-Battery Buck Mode

In this mode of operation, power source $12_1$, a fuel cell in the illustrated embodiment, is used to charge power source $12_2$, a battery in the illustrated embodiment, via the DC Link. In order to carry out this mode of operation, the voltage level of voltage source $12_1$, and therefore, the DC Link, has to be bucked to the necessary level in order to charge power source $12_2$.

In this mode, as with the previously discussed modes, control unit 22 is configured to control the conduction states of the switches in switch network 24 in three distinct time intervals, as shown in Table 4 below, resulting in three separate switch arrangements, one for each time interval.

TABLE 4

DC Link-to-Battery Buck Mode

| TIME INTERVAL 1 | | TIME INTERVAL 2 | | TIME INTERVAL 3 | |
|---|---|---|---|---|---|
| $T_1$ | On | $T_1$ | Off | $T_1$ | Off |
| $T_2$ | Off | $T_2$ | Off | $T_2$ | On |
|  |  | Diode | On | Diode | Off |
| $T_3$ | On | $T_3$ | On | $T_3$ | On |
| $T_4$ | Off | $T_4$ | Off | $T_4$ | Off |
| $T_5$ | Off | $T_5$ | Off | $T_5$ | Off |
| $T_6$ | Off | $T_6$ | Off | $T_6$ | Off |

With combined reference to Table 4 and FIGS. 2 and 3, during the first time interval of this mode, control unit 22 controls the switches in switch network 24 for conduction/blocking in accordance with arrangement A1. In arrangement A1, switch T1 of switch pair 26, and switch T3 of switch pair 28, are turned ON (for conduction), while the remainder of the switches are turned OFF (no conduction). Accordingly, this results in current flowing from the positive terminal of the DC Link, through switch T1, through inductor 34, through switch T3, to the positive terminal of power source $12_2$, to ground, thus charging power source $12_2$.

During the second time interval, control unit 22 controls the switches in switch network 24 in accordance with arrangement A2. In arrangement A2, switch T1 of switch pair 26 is turned OFF, switch T3 of switch pair 28 remains ON, and the remaining switches are kept OFF. This results in circulating current through inductor 34, through switch T3, through power source $12_2$, through the diode of switch T2 of switch pair 26, and back to inductor 34. The flow of the current through the diode results in a voltage drop within or near the range of 1.0V–1.2V.

In the third time interval, control unit 22 controls the switches of switch network 24 in accordance with arrangement A3. In arrangement A3, switch T3 of switch pair 28 remains ON, switch T2 of switch pair 26 is turned ON, and the remaining switches are kept OFF. The current continues to flow from inductor 34, through switch T3, through the positive terminal of power source $12_2$, through switch T2 (as opposed to through its associated diode), and back to inductor 34. The flow of the current through switch T2, as opposed to the diode, effectively makes switch T2 a synchronous rectifier (when the switch is a MOSFET device) which results in a reduced voltage drop to a level around 0.2V, thereby making the system more efficient (i.e., less of a forward voltage drop).

With continued reference to FIGS. 2 and 3, the charging of power source $12_2$ is controlled by controlling the ON time of switch T1. The duty cycle of switch T1 can be calculated using the following equation designated as equation (7):

$$D = \frac{TI_1}{T}; \tag{7}$$

wherein D is the duty cycle, $TI_1$ is the amount of time switch T1 is in the ON conductive state, and T is the total time of the period.

Control unit 22 is configured and programmed to carry out this mode of operation by adjusting the duty cycles of the switches based on inputs relating to the required voltage level of application 16, the output voltage on the DC Link, and the voltage level of the battery (i.e., the level of second source $12_2$), for example. Strategies are known to accomplish the foregoing, and following a first cycle through the mode of operation, the cycle may be repeated.

DC Link-to-Ultracapacitor Buck Mode

In this mode of operation, power source $12_1$, a fuel cell in the illustrated embodiment, is used to charge power source $12_3$, an ultracapacitor in the illustrated embodiment, via the DC Link. In order to carry out this mode of operation, the voltage level of power source $12_1$, and therefore, of the DC Link, has to be bucked to the necessary level in order to charge power source $12_3$.

In this mode, as with the previously discussed modes, control unit 22 is configured to control the conduction states of the switches in switch network 24 in three distinct time intervals, as shown in Table 5 below, resulting in three separate switch arrangements, one for each time interval.

TABLE 5

DC Link-to-Ultracapacitor Buck Mode

| | TIME INTERVAL 1 | TIME INTERVAL 2 | TIME INTERVAL 3 |
|---|---|---|---|
| $T_1$ | On | Off | Off |
| $T_2$ | Off | Off | On |
| | | Diode On | Diode Off |
| $T_3$ | Off | Off | Off |
| $T_4$ | Off | Off | Off |
| $T_5$ | On | On | On |
| $T_6$ | Off | Off | Off |

With combined reference to Table 5 and FIGS. 2 and 3, during the first time interval of this mode, control unit 22 controls the switches in switch network 24 for conduction/blocking in accordance with arrangement A1. In arrangement A1, switch T1 of switch pair 26 and switch T5 of switch pair 30 are turned ON (for conduction), while the remainder of the switches are turned OFF (no conduction). Accordingly, this results in current flowing from the positive terminal of the DC Link, through switch T1, through inductor 32, through switch T5, through the positive terminal of power source $12_3$, to ground, thus charging power source $12_3$.

During the second time interval, control unit 22 controls the switches in switch network 24 in accordance with arrangement A2. In arrangement A2, switch T1 of switch pair 26 is turned OFF, switch T5 of switch pair 30 remains ON, and the remaining switches are kept OFF. This results in circulating current flowing out of inductor 32, through switch T5, through the positive terminal of power source $12_3$, through the diode of switch T2 of switch pair 26, and back to inductor 32. The flow of the current through the diode results in a voltage drop within or near the range of 1.0V–1.2V.

In the third time interval, control unit 22 controls the switches of switch network 24 in accordance with arrangement A3. In arrangement A3, switch T5 of switch pair 30 remains ON, switch T2 of switch pair 26 is turned ON, and the remaining switches are kept OFF. The current continues to flow from inductor 32, through switch T5, through the positive terminal of power source $12_3$, through switch T2 (as opposed to through its associated diode), and back to inductor 34. The flow of the current through T2, as opposed to the diode, effectively makes switch T2 a synchronous rectifier (when the switch is a MOSFET device) which results in a reduced voltage drop to a level around 0.2V, thereby making the system more efficient (i.e., less of a forward voltage drop).

With continued reference to FIGS. 2 and 3, the charging of power source $12_3$ is controlled by controlling the ON time of switch T1. The duty cycle of switch T1 can be calculated using the following equation designated as equation (8):

$$D = \frac{TI_1}{T}; \tag{8}$$

wherein D is the duty cycle, $TI_1$ is the amount of time switch T1 is in the ON conductive state, and T is the total time of the period.

Control unit 22 is configured and programmed to carry out this mode of operation by adjusting the duty cycles of the switches based on inputs relating to the required voltage level of application 16, the output voltage level on the DC Link, and the voltage level of the ultracapacitor (i.e., the level of the third source $12_3$), for example. Strategies are known to accomplish the foregoing, and following a first cycle through the mode of operation, the cycle may be repeated.

Battery-to-Ultracapacitor Buck Mode

In this mode of operation, power source $12_2$, a battery in the illustrated embodiment, is used to charge power source $12_3$, an ultracapacitor in the illustrated embodiment, when the voltage level of power source $12_2$ is greater than that of power source $12_3$. In order to carry out this mode of operation, the voltage level of power source $12_2$ has to be bucked to the necessary level in order to charge power source $12_3$.

In this mode, as with the three previously discussed modes, control unit 22 is configured to control the conduction states of the switches in switch network 24 in three distinct time intervals, as shown in Table 6 below, resulting in three separate switch arrangements, one for each time interval.

TABLE 6

Battery-to-Ultracapacitor Buck Mode

| TIME INTERVAL 1 | | TIME INTERVAL 2 | | TIME INTERVAL 3 | |
|---|---|---|---|---|---|
| $T_1$ | Off | $T_1$ | Off | $T_1$ | Off |
| $T_2$ | Off | $T_2$ | Off | $T_2$ | Off |
| $T_3$ | On | $T_3$ | Off | $T_3$ | Off |
| $T_4$ | Off | $T_4$ Diode | Off On | $T_4$ Diode | On Off |
| $T_5$ | On | $T_5$ | On | $T_5$ | On |
| $T_6$ | Off | $T_6$ | Off | $T_6$ | Off |

With combined reference to Table 6 and FIGS. 2 and 3, during the first time interval of this mode, control unit 22 controls the switches in switch network 24 for conduction/blocking in accordance with arrangement A1. In arrangement A1, switch T3 of switch pair 28 and switch T5 of switch pair 30, are turned ON (for conduction), while the remainder of the switches are turned OFF (no conduction). Accordingly, this results in current flowing from the positive terminal of power source $12_2$, through switch T1, through inductor 34, through inductor 32, through switch T5, through the positive terminal of power source $12_3$, to ground, thus charging power source $12_3$.

During the second time interval, control unit 22 controls the switches in switch network 24 in accordance with arrangement A2. In arrangement A2, switch T3 of switch pair 28 is turned OFF, switch T5 of switch pair 30 remains ON, and the remaining switches are kept OFF. This results in circulating current flowing out of inductor 32, through switch T5, through the positive terminal of power source $12_3$, through the diode of switch T4 of switch pair 28, and back to inductor 32 via inductor 34. The flow of the current through the diode results in a voltage drop within or near the range of 1.0V–1.2V.

In the third time interval, control unit 22 controls the switches of switch network 24 in accordance with arrangement A3. In arrangement A3, switch T5 of switch pair 30 remains ON, switch T4 of switch pair 28 is turned ON, and the remaining switches are kept OFF. The current continues to flow from inductor 32 through switch T5, through the positive terminal of power source $12_3$, through switch T4 (as opposed to through the associated diode), and back to inductor 32 via inductor 34. The flow of the current through switch T4, as opposed to the diode, effectively makes T4 a synchronous rectifier (when the switch is a MOSFET device) which results in a reduced voltage drop, to a level of around 0.2V, thereby making the system more efficient (i.e., less of a forward voltage drop).

With continued reference to FIGS. 2 and 3, the charging of power source $12_3$ is controlled by controlling the ON time of switch T3. The duty cycle of switch T3 can be calculated using the following equation designated as equation (9):

$$D = \frac{TI_1}{T}; \quad (9)$$

wherein D is the duty cycle, $TI_1$ is the amount of time switch T3 is in the ON conductive state, and T is the total time of the period.

Control unit 22 is configured and programmed to carry out this mode of operation by adjusting the duty cycles of the switches based on inputs relating to the required voltage level of application 16, and the voltage levels of the battery and ultracapacitor (i.e., the voltage levels of the second and third sources $12_2$ and $12_3$), for example. Strategies are known to accomplish the foregoing, and following a first cycle through the mode of operation, the cycle may be repeated.

While a three source system having six modes of operation is shown and described above, it should be noted that this configuration is exemplary only, and not meant to be limiting in nature. Other configurations having more or less sources are also within the scope and spirit of the invention. Thus, power converter 11 may be used in connection with other configurations and may, therefore, have more or less than six modes of operation.

The invention claimed is:

1. A power system for transferring power between a plurality of power sources comprising:
   a first power source having a first pair of terminals associated therewith;
   a second power source having a second pair of terminals associated therewith;
   a third power source having a third pair of terminals associated therewith; and
   a power converter including,
   (i) a first pair of switches connected to the first pair of terminals, said first switch pair comprising an upper switch having a drain, a gate, and a source terminal, and a lower switch having a drain, a gate, and a source terminal, wherein said source terminal of said upper switch is electrically connected to the drain terminal of the lower switch thereby forming a first common node, and wherein each of the first pair of switches has an anti-parallel diode associated therewith;
   (ii) a second pair of switches connected to the second pair of terminals, said second switch pair comprising an upper switch having a drain, a gate, and a source terminal, and a lower switch having a drain, a gate, and a source terminal, wherein said source terminal of said upper switch is electrically connected to the drain terminal of the lower switch thereby forming a second common node, and wherein each of the second pair of switches has an anti-parallel diode associated therewith;
   (iii) a third pair of switches connected to the third pair of terminals, said third switch pair comprising an upper switch having a drain, a gate, and a source terminal, and a lower switch having a drain, a gate, and a source terminal, wherein said source terminal of said upper switch is electrically connected to the drain terminal of the lower switch thereby forming a third common node, and wherein each of the third pair of switches has an anti-parallel diode associated therewith;

(iv) a first inductor connected between the first common node and the second common node;
(v) a second inductor connected between the first common node and the third common node; and
(vi) a control unit configured to actuate the switches in the first, second, and third pairs of switches in accordance with one of a plurality of modes of operation for transferring power between at least a pair of said first, second, and third power sources.

2. A power system according to claim 1 wherein the first power source is a DC Link which derives from a fuel cell whose output is electrically connected to the input of a power conditioner, the second power source is a battery, and the third power source is an ultracapacitor; and wherein said plurality of modes of operation include:
a battery-to-DC Link boost mode;
a battery-to-ultracapacitor boost mode;
an ultracapacitor-to-DC Link boost mode;
a DC Link-to-battery buck mode;
a DC Link-to-Ultracapacitor buck mode; and
a battery-to-ultracapacitor buck mode.

3. A power system according to claim 2 further comprising an application electrically connected to the output of the power conditioner.

4. A power system according to claim 3 wherein said application further includes an inverter and a load connected to said inverter.

5. A power system according to claim 1 wherein the power converter switches of the first, second, and third pairs of switches are of the MOSFET type.

6. A power system according to claim 1 wherein the power converter switches of the first, second, and third pairs of switches are of the IGBT type.

7. A power system according to claim 1 wherein the power converter control unit is configured to control ON/OFF conduction states of the switches to define a respective switch arrangement corresponding to each one of the plurality of modes of operation, the control unit being further configured to establish a sequence of switch arrangements during corresponding time intervals for each one of the plurality of modes of operation.

8. A power system for transferring power between a plurality of power sources comprising:
a first power source having a first pair of terminals associated therewith;
a second power source having a second pair of terminals associated therewith;
a third power source having a third pair of terminals associated therewith; and
a power converter including,
(i) a first pair of switches connected to the first pair of terminals, said first switch pair comprising an upper switch having a drain, a gate, and a source terminal, and a lower switch having a drain, a gate, and a source terminal, wherein said source terminal of said upper switch is electrically connected to the drain terminal of the lower switch thereby forming a first common node, and wherein each of the first pair of switches has an anti-parallel diode associated therewith;
(ii) a second pair of switches connected to the second pair of terminals, said second switch pair comprising an upper switch having a drain, a gate, and a source terminal, and a lower switch having a drain, a gate, and a source terminal, wherein said source terminal of said upper switch is electrically connected to the drain terminal of the lower switch thereby forming a second common node, and wherein each of the second pair of switches has an anti-parallel diode associated therewith;
(iii) a third pair of switches connected to the third pair of terminals, said third switch pair comprising an upper switch having a drain, a gate, and a source terminal, and a lower switch having a drain, a gate, and a source terminal, wherein said source terminal of said upper switch is electrically connected to the drain terminal of the lower switch thereby forming a third common node, and wherein each of the third pair of switches has an anti-parallel diode associated therewith;
(iv) a first inductor connected between the first common node and the second common node;
(v) a second inductor connected between the first common node and the third common node; and
(vi) a control unit configured to actuate the switches in the first, second, and third pairs of switches in accordance with one of a plurality of modes of operation for transferring power between at least a pair of said first, second, and third power sources; wherein said plurality of modes of operation include:
a battery-to-DC Link boost mode;
a battery-to-ultracapacitor boost mode;
an ultracapacitor-to-DC Link boost mode;
a DC Link-to-battery buck mode;
a DC Link-to-Ultracapacitor buck mode; and
a battery-to-ultracapacitor buck mode.

9. A power system according to claim 8 wherein the first power source is a DC Link which derives from a fuel cell whose output is electrically connected to the input of a power conditioner, the second power source is a battery, and the third power source is an ultracapacitor.

10. A power system according to claim 9 further comprising an application electrically connected to the output of the power conditioner.

11. A power system according to claim 10 wherein said application further includes an inverter and a load connected to said inverter.

12. A power system according to claim 8 wherein the power converter switches of the first, second, and third pairs of switches are of the MOSFET type.

13. A power system according to claim 8 wherein the power converter switches of the first, second, and third pairs of switches are of the IGBT type.

14. A power system according to claim 8 wherein the power converter control unit is configured to control ON/OFF conduction states of the switches to define a respective switch arrangement corresponding to each one of the plurality of modes of operation, the control unit being further configured to establish a sequence of switch arrangements during corresponding time intervals for each one of the plurality of modes of operation.

15. A power system for transferring power between a plurality of power sources comprising:
a first power source having a first pair of terminals associated therewith, wherein the first power source is a DC Link which derives from a fuel cell whose output is electrically connected to the input of a power conditioner;
a second power source having a second pair of terminals associated therewith, wherein the second power source is a battery;
a third power source having a third pair of terminals associated therewith, wherein the third power source is an ultracapacitor; and a power converter including,
  (i) a first pair of switches connected to the first pair of terminals, said first switch pair comprising an upper switch having a drain, a gate, and a source terminal, and a lower switch having a drain, a gate, and a source terminal, wherein said source terminal of said upper switch is electrically connected to the drain terminal of the lower switch thereby forming a first common node, and wherein each of the first pair of switches has an anti-parallel diode associated therewith;
  (ii) a second pair of switches connected to the second pair of terminals, said second switch pair comprising an upper switch having a drain, a gate, and a source terminal, and a lower switch having a drain, a gate, and a source terminal, wherein said source terminal of said upper switch is electrically connected to the drain terminal of the lower switch thereby forming a second common node, and wherein each of the second pair of switches has an anti-parallel diode associated therewith;
  (iii) a third pair of switches connected to the third pair of terminals, said third switch pair comprising an upper switch having a drain, a gate, and a source terminal, and a lower switch having a drain, a gate, and a source terminal, wherein said source terminal of said upper switch is electrically connected to the drain terminal of the lower switch thereby forming a third common node, and wherein each of the third pair of switches has an anti-parallel diode associated therewith;
  (iv) a first inductor connected between the first common node and the second common node;
  (v) a second inductor connected between the first common node and the third common node; and
  (vi) a control unit configured to actuate the switches in the first, second, and third pairs of switches in accordance with one of a plurality of modes of operation for transferring power between at least a pair of said first, second, and third power sources.

16. A power system according to claim 15 wherein the plurality of modes of operation include:
  a battery-to-DC Link boost mode;
  a battery-to-ultracapacitor boost mode;
  an ultracapacitor-to-DC Link boost mode;
  a DC Link-to-battery buck mode;
  a DC Link-to-Ultracapacitor buck mode; and
  a battery-to-ultracapacitor buck mode.

17. A power system according to claim 15 further comprising an application electrically connected to the output of the power conditioner.

18. A power system according to claim 17 wherein said application further includes an inverter and a load connected to said inverter.

19. A power system according to claim 15 wherein the power converter switches of the first, second, and third pairs of switches are of the MOSFET type.

20. A power system according to claim 15 wherein the power converter switches of the first, second, and third pairs of switches are of the IGBT type.

21. A power system according to claim 15 wherein the power converter control unit is configured to control ON/OFF states of the switches to define a respective switch arrangement corresponding to each one of the plurality of modes of operation, the control unit being further configured to establish a sequence of switch arrangements during corresponding time intervals for each one of the plurality of modes of operation.

* * * * *